Sept. 23, 1958 M. GANSER 2,852,781
FLEXIBLE STAY, ESPECIALLY FOR CORSETS
Filed March 4, 1955
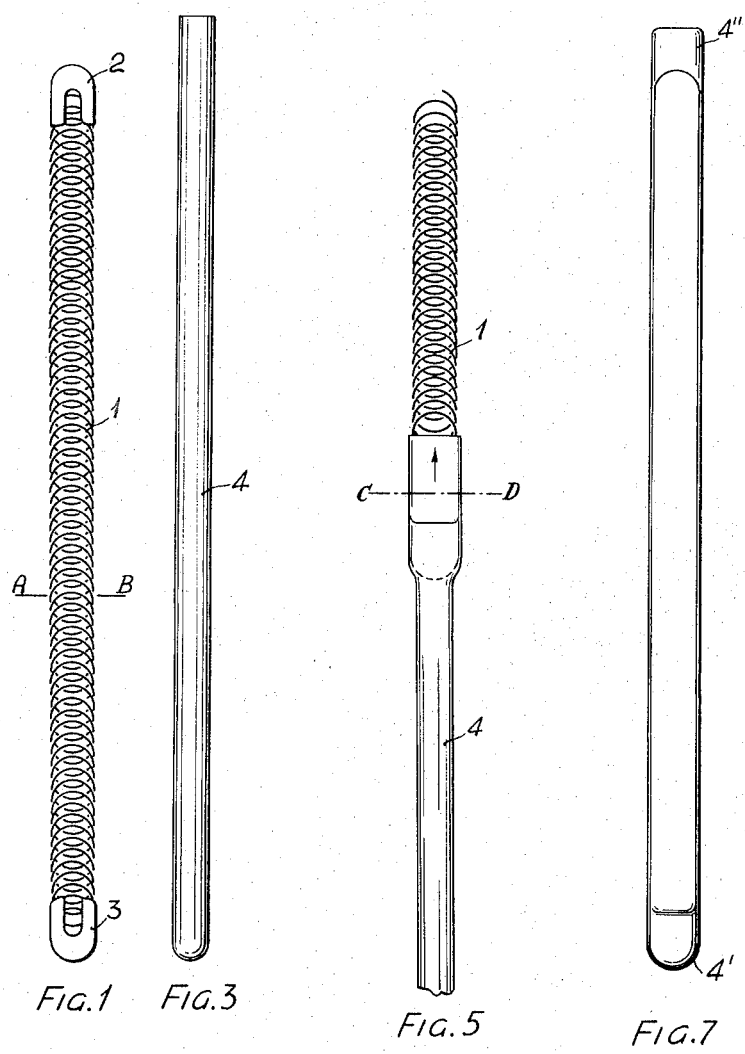
INVENTOR
MARIE GANSER
BY Young, Emery & Thompson
ATTORNEYS

United States Patent Office 2,852,781
Patented Sept. 23, 1958

2,852,781
FLEXIBLE STAY, ESPECIALLY FOR CORSETS

Marie Ganser, Lugano, Switzerland

Application March 4, 1955, Serial No. 492,132

Claims priority, application Switzerland March 8, 1954

1 Claim. (Cl. 2—260)

The present invention has for its object the provision of a stay, flexible in all directions, especially for corsets, sheaths and other garments. It is characterized by a flexible metallic strip and a protecting sheath of elastic but not metallic material, slipped over it and closed at its ends. According to a preferred form of construction the sheath can be applied by slipping over the flexible stay or by compression. In the first instance the sheath is tubular and is preferably made of a plastic material like, for instance, polyethylene, nylon, polyvinyl chloride and the like.

The metallic strip can be constituted, for example, by a small flattened spiral per se known and can be provided at the ends with a metallic or non metallic protection cap, which is, therefore, covered by the sheath. For greater clarity the annexed drawing represents some preferred forms of realization of the subject stay.

Fig. 1 represents a small flattened metallic spiral, provided at the ends with metallic or plastic or other material protection caps;

Fig. 2 represents a cross section taken through a normal plane passing through the line A—B of Fig. 1;

Fig. 3 shows a sheath according to the invention;

Fig. 4 is a cross section corresponding to Fig. 3;

Fig. 5 represents the stay at the instant the metallic spiral is introduced into the sheath;

Fig. 6 represents a cross section of Fig. 5 according to plane C—D;

Fig. 1 represents the completed stay.

The metal spiral represented in Fig. 1 is achieved in a known manner by compressing between two parallel planes a steel wire cylindrical helical spring 1. The two ends are then protected with caps 2 and 3, also flattened, and generally of brass.

Sheath 4 (Fig. 3) according to the invention is preferably constituted by a tube of plastic material (for instance, polyethylene, nylon, etc.) of such size as to allow of slipping into it under a slight friction the spiral 1, the said tube flattening out during the operation as represented by Figs. 5 and 6 and being formed into a flattened ring shape.

The end 4' has been closed beforehand, while the end 4" of the sheath 4, slightly overrunning the end of the metal spiral 1, is closed by welding or seaming.

It is obvious that the small caps 2 and 3 protecting the flat metal strip may be done away with, as the sheath 4 gives a good protection to the ends of the said strip, and that instead of being tubular the sheath will result as such when applied to the strip itself by compression.

The advantages afforded by the stay according to the invention lie above all in the fact that the plastic material sheath, given its thickness still allows the metal strip any movement in any direction, ensures a perfect protection, substantially greater than the one that could be offered by a simple varnishing of the strip.

I claim:

An elongated flexible stay in the form of a strip for corsets comprising a resilient flattened metal spiral spring having end caps engaging the free ends of the spring, and a flattened protective elastic sheath having a relatively low coefficient of friction closely encompassing said spring and caps, said sheath being closed at both sides and ends, whereby said stay may yield to bending or twisting forces and the convolutions of said spring may freely move within said sheath.

References Cited in the file of this patent

UNITED STATES PATENTS

| | | |
|---|---|---|
| 1,061,081 | Johnson | May 6, 1913 |
| 1,276,700 | Kleemann | Aug. 20, 1918 |
| 1,837,958 | Ferrerro | Dec. 22, 1931 |
| 1,933,806 | Higgins | Nov. 7, 1933 |
| 2,161,080 | Murphy et al. | June 6, 1939 |
| 2,637,041 | Bachman | May 5, 1953 |
| 2,644,947 | Schwartz | July 14, 1953 |
| 2,696,005 | Schaumer | Dec. 7, 1954 |
| 2,710,967 | Bohm | June 21, 1955 |

FOREIGN PATENTS

| | | |
|---|---|---|
| 476,618 | Canada | Sept. 4, 1951 |
| 1,074,295 | France | Mar. 31, 1954 |